United States Patent

[11] 3,596,043

| [72] | Inventor | Anton J. Sporri<br>Tallapoosa, Ga. |
|---|---|---|
| [21] | Appl. No | 815,446 |
| [22] | Filed | Apr. 11, 1969 |
| [45] | Patented | July 27, 1971 |
| [73] | Assignee | Southern Can Company<br>Tallapoosa, Ga. |

[54] METHOD OF SEAM WELDING OVERLAPPING WORKPIECES
1 Claim, 13 Drawing Figs.

[52] U.S. Cl. ............................................. 219/83, 219/84
[51] Int. Cl. ............................................. B23k 11/06
[50] Field of Search ............................................. 219/81, 82, 83, 84

[56] References Cited
UNITED STATES PATENTS

| 1,300,603 | 4/1919 | Gravell | 219/83 X |
| 3,015,018 | 12/1961 | Rudd | 219/59 X |
| 3,015,713 | 1/1962 | Eckler et al. | 219/81 X |
| 3,102,945 | 9/1963 | Opprecht | 219/81 |

Primary Examiner—J. V. Truhe
Assistant Examiner—Hugh D. Jaeger
Attorneys—A. Yates Dowell and A. Yates Dowell, Jr.

ABSTRACT: A continuous lap seam is welded at the extreme edge by passing it between a pair of roller electrode members each of which carries a continuous length of a wire electrode, the wire interengaging the rollers and having an outer work engaging surface which is substantially flat, thereby providing a welded seam entirely outwardly of the edge of at least one of the lapping portions.

INVENTOR
ANTON J. SPORRI

ATTORNEYS

FIG.3 FIG.4 FIG.5
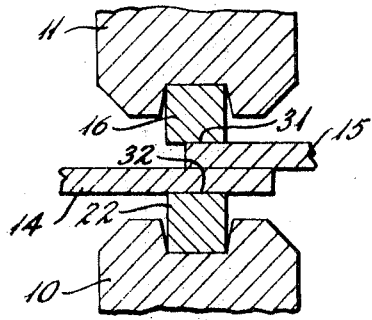
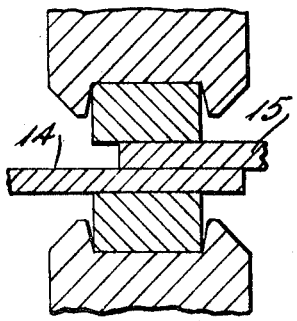
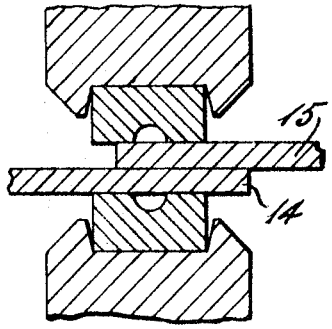
FIG.6 FIG.7 FIG.8
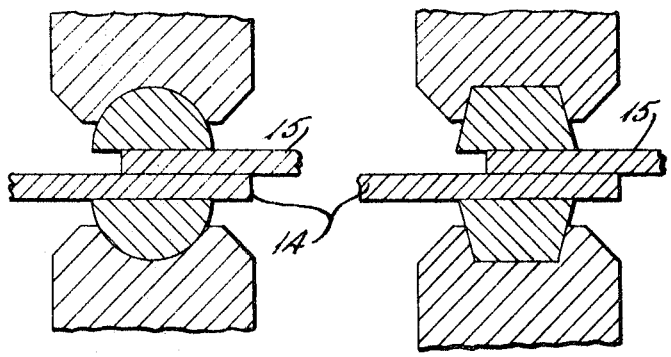
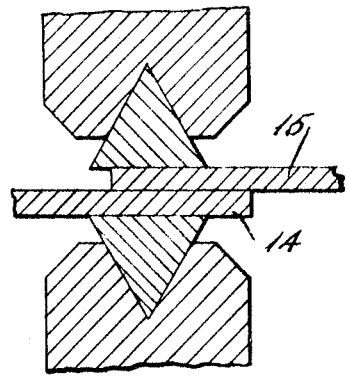
FIG.9 FIG.10 FIG.11
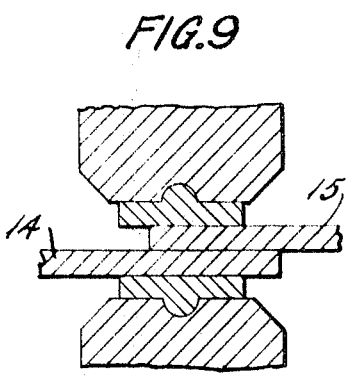
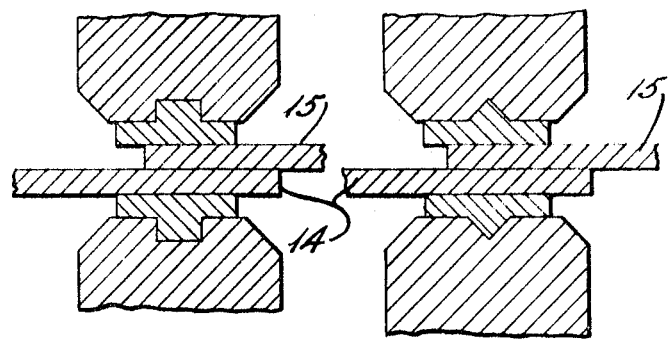
FIG.12
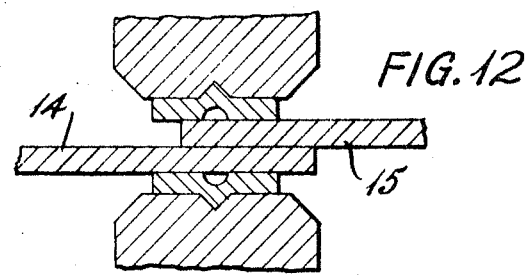
INVENTOR
ANTON J. SPORRI

METHOD OF SEAM WELDING OVERLAPPING WORKPIECES

BACKGROUND OF THE INVENTION

1. Field of the Invention

This invention relates to the forming of seams between overlapping portions of metal sheets and more particularly the forming of seams in thin sheets including tinned or galvanized sheet metal of the type used in containers for various products, such as foods, paints, and various chemicals.

2. Description of the Prior Art

Seams in thin tinplate as, for example in containers for food and paint, have generally been interfolded and soldered, thereby sealing the cut edges with solder. In a container for such products, it is necessary that no unplated or uncoated portion be exposed to the contents of the container nor that a raw edge be exposed in a container which is to be resealed. Furthermore, it is necessary, especially with food products, that no interior seam of the container have any overlapping portions which are not sealed because these would provide a crevice which would present a sanitary or contamination problem.

Welded seams in can bodies and apparatus for producing these have been described, for example in the U.S. Pats. to C. J. Smith, No. 2,838,651, and P. Opprecht, 3,102,945. One of the problems in connection with the welding of coated plates has been contamination of the electrode by the workpiece during the welding operation. Such problem and one approach to overcoming it is described in the Opprecht U.S. Pat. No. 3,102,945, in which the roller electrode has a groove for carrying a continuous electrode wire. However, the electrode wire of the prior art has been of circular cross section or as in FIG. 3 of Opprecht, U.S. Pat. No. 3,102,945, has presented a working surface which is substantially circular or elliptical. As indicated in the prior art the welded joint is formed away from the edges of the overlapping sheets. The result is that at each edge there is an area of overlapping which is not welded.

For sanitary purposes and to prevent contamination, the presence of an unsealed space on the interior of a container for products such as food is undesirable. Further, it is necessary that the uncoated cut edge of the material which is on the interior be sealed. Attempts have been made to seal the seam by applying lacquer along the joint. However, for various reasons including flexing of the metal, there is a possibility that the lacquer seam may be ruptured in a joint of the type described in which there is a free edge of metal which is not welded to the adjacent wall.

The circular or elliptical electrode wire of the prior art provides a relatively narrow lateral area, substantially line contact, for surface-to-surface contact with the workpiece and, furthermore, could not be applied precisely along the edge of either workpiece because of the impossibility of maintaining such close tolerances in the manufacturing processes. Attempts to maintain contact along the surface edge with a round or elliptical cross section wire would result in rocking off the edge at times and away from the edge at other times thereby failing to form a proper weld.

SUMMARY OF THE INVENTION

The present invention employs apparatus and procedures generally as described in the U.S. Pat. to Opprecht, No. 3,102,945. However, instead of using an electrode wire which is substantially circular or elliptical in cross section, the wire is of a cross section which will present substantially plane surfaces to the work and is positioned at the extreme edge or extending over the edge portion of the sheet for the interior of the container in order to form a weld completely along such edge and without any possibility of a crevice therealong.

BRIEF DESCRIPTION OF THE DRAWING

The invention will be described in conjunction with the accompanying drawings in which:

FIG. 3 is a further enlarged fragmentary illustrating the details of mounting and use of a wire electrode in accordance with the invention;

FIGS. 4—12 are enlarged cross sections of modifications of the wire electrode and;

Figure 1:
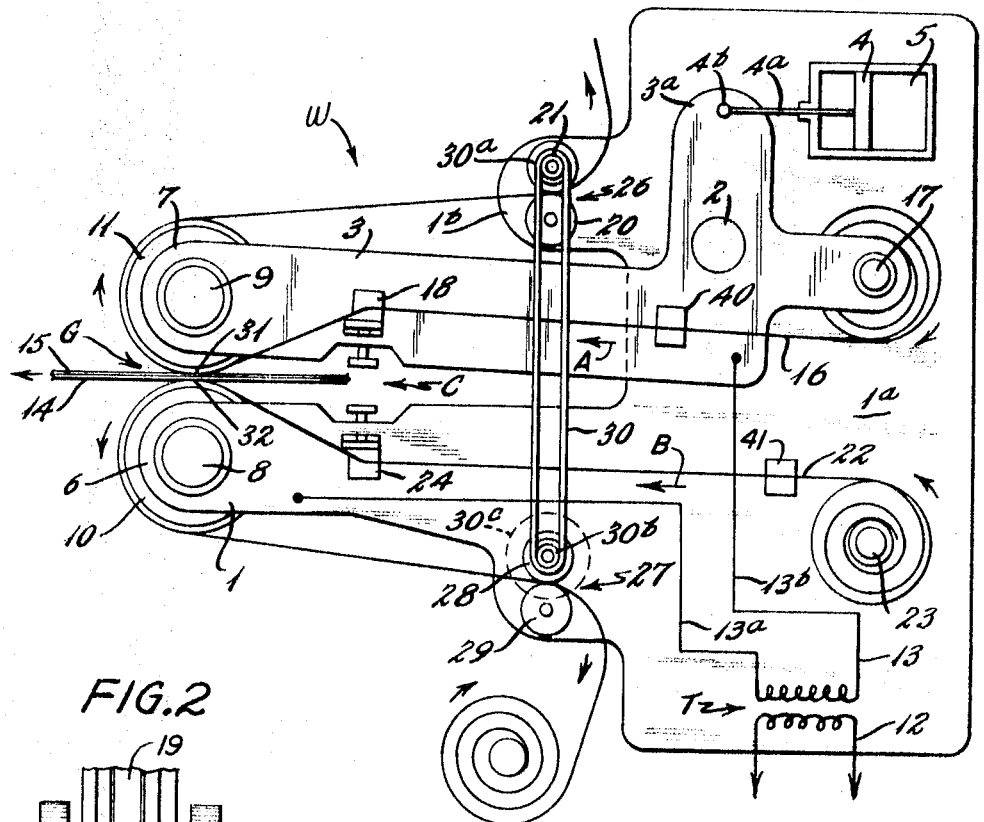
FIG. 1 is a schematic side elevation of an electric seam-welding apparatus of the type embodying the invention.
Figure 2:
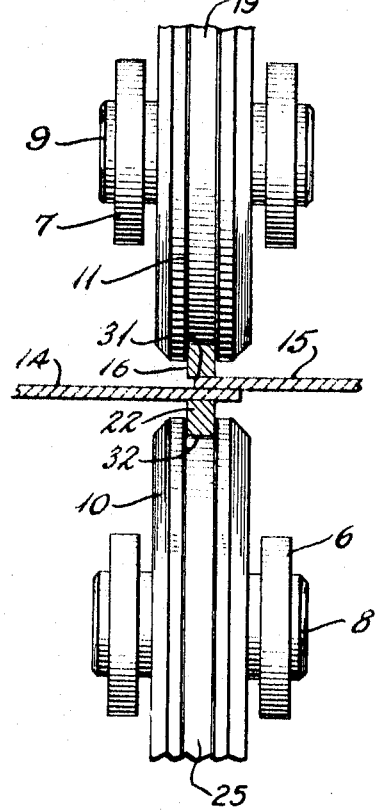
FIG. 2 is an enlarged fragmentary front elevation of two wire electrodes employed in the apparatus of FIG. 1 and of the means for supporting the electrodes during their contact with the workpieces in the welding gap.
Figure 13:
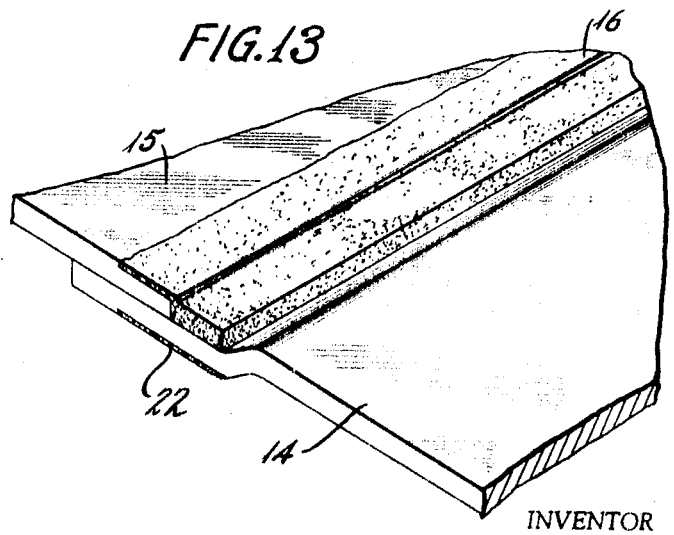
FIG. 13 is a perspective of a seam in accordance with the invention.

Referring now in greater detail to the illustrated embodiments, and first to FIG. 1, there is shown an automatic electric resistance welding apparatus W of the seam-welding type which is particularly suited for continuously joining the overlapping edges of sheet-metal workpieces, such as tinned iron sheets, aluminum sheets and the like. The apparatus W comprises a frame 1a which is formed with a rigid arm 1 and which also supports a rockable arm 3, the latter assuming the shape of a two-armed lever and rotatably mounted on a pivot axle 2 carried by the frame 1a. The means for rocking the arm 3 may assume a number of forms, for example, such rocking means may comprise one or more prestressed helical or flat springs. In the embodiment of FIG. 1, this rocking means comprises a hydraulic or pneumatic cylinder 5 which receives a double-acting piston 4 connected with a piston rod 4a, the latter articulately fixed to a lug 3a forming part of the arm 3. The connection between the lug 3a and the piston rod 4a comprises a pin 4b. The purpose of the electrode rocking or reciprocating piston-cylinder means 4, 5 is to move the forward end of the arm 3 toward the forward end 6 of the fixed arm 1 so that these arms define therebetween a welding gap G for the passage of the workpieces here shown as two overlapping steel, iron or aluminum plates 14, 15. The rocking means 4, 5 also presses the electrodes with a given force against the exposed sides of the workpieces 14, 15. The forward ends 6, 7 of the arms 1, 3 support two parallel shafts 8, 9 for the pressing or electrode supporting rollers 10, 11, respectively. As is shown in FIG. 2, the forward ends of the arms 1, 3 may be forked so that they define recesses for the rollers 10, 11, respectively. The upper electrode associated with the pressing roller 11 assumes the form of a metallic wire 16 which is carried in the peripheral groove 19 formed in the upper roller 11. The current conducting wire electrode 16 is convoluted onto a suitable supply means, e.g. a spool 17 which is mounted at the rear end of the rockable arm 3 and, on its way to the groove 19, the wire electrode passes between the cooperating components of a guiding and tensioning arrangement 18 which is mounted on the arm 3. After passing about the periphery of the pressing roller 11, the wire electrode 16 is led between a pair of cooperating advancing rolls 20, 21 which are mounted on a bracket 1b forming part of the frame 1a of the welding apparatus and which together constitute an advancing means 26. The rolls 20, 21 are preferably formed with a suitable profile to firmly grip the wire electrode 16 so that the latter is advanced in the direction indicated by the arrow A. One of the rolls 20, 21 is preferably under the bias of suitable resilient means to insure proper engagement with the wire electrode 16.

The second electrode 22 also assumes the form of a wire which is of appropriate cross-sectional contour and is convoluted on so that it may be paid out by a supply means in the form of a spool 23 mounted on the stationary frame 1a. This second wire electrode 22 advances in the direction of the arrow B and passes between the cooperating components of a second guiding and tensioning arrangement 24 which is carried by the fixed arm 1, the electrode 22 thereupon passing through the peripheral groove 25 of the lower pressing or electrode supporting roller 10 (see FIG. 2) and between the rolls 28, 29 of a second advancing means 27 which latter, too, is supported by the fixed arm 1. The configuration and mounting of the rolls 28, 29 is preferably the same as that of the upper rolls 20, 21.

The rotation of advancing rolls 20, 21 and 28, 29 may be synchronized by the provision of an endless chain 30 which travels about two sprockets 30a, 30b mounted on the shafts of rolls 21, 28 respectively. The sprocket 30b is driven by an electric motor 30c or the like. Thus, the wire electrodes 16, 22 are advanced at identical speeds, either continuously or intermittently, and their speeds correspond exactly to the forward speed of the workpieces 14, 15 which advance in the direction indicated by the arrow C. It is also possible to utilize the motor 30c for advancing the workpieces 14, 15. It will be readily understood that the advancing means 26, 27 may be replaced by a single advancing means, for example, by a pair of cooperating rolls each of which is formed with two peripheral notches for the wire electrodes 16, 22.

The means for supplying welding current to the wire electrodes 16, 22 comprises a transformer T which may be mounted on the frame 1a and whose primary winding 12 is adjacent to a secondary winding 13, the latter being connected in a welding circuit whose conductors 13a, 13b pass through the arms 1, 3, respectively, and are electrically connected with the supporting rollers 10, 11, respectively. The circuit of the secondary winding 13 is completed by the workpieces 14, 15 which are in contact with the wire electrodes 22, 16, respectively, the latter in turn being in substantial surface-to-surface contact with the rollers 10, 11, respectively. The arms 1 and 3 are electrically insulated from one another.

The present invention provides for the use of electrode wire of noncircular and nonelliptical cross-sectional area and positioning the electrode wire so that it is at the edge of or preferably projects slightly beyond the edge of the workpiece 15 as indicated in FIGS. 2 and 3. The workpieces 14 and 15 are guided into position beneath the rollers by guide means, not shown, which is well known in the art. The workpiece 15 corresponds to the interior piece where the workpieces form a seam in a container. Stated differently, the upper surfaces, as illustrated in FIG. 2, of the workpieces 14 and 15 are disposed inwardly of the container.

By the use of a flat contacting surface a weld may be formed along an edge. The electrode may be positioned to lap the edge sufficiently to accommodate any unevenness therein. The use of a flat electrode surface provides only a slightly wider area of weld than was previously obtained through wires of circular or elliptical cross section but due to its flatness it can be used along an edge, unlike a circular or elliptical electrode.

Instead of employing wire of square cross section, it may be rectangular as indicated in FIG. 4, may have a central groove as indicated in FIG. 5, may be semicircular as indicated in FIG. 6, wedge-shaped as indicated in FIG. 7, or an equilateral triangle as indicated in FIG. 8. Further, the wire may have a longitudinal rib, the same being indicated as semicircular in FIG. 9, rectangular in FIG. 10, and triangular in FIGS. 11 and 12. In FIG. 12 the contacting face has a longitudinal groove intermediate the sides.

The size of the wire may be varied depending upon the nature of the work, as for example, it has been found that wire of rectangular cross section having a thickness of 0.025 inches and a width of 0.090 inches, or having a thickness of 0.020 inches and a width of 0.100 inches, performs satisfactorily. The width of such wire is substantially less than that of the overlapping ends of the work in order to provide the appropriate pressure and current density for a satisfactory weld.

Use of such electrode wire having a substantially plane working surface produces a continuous weld without any gap along the desired side. This weld may be sealed with lacquer, as is customary, and flexing of the material does not rupture the lacquer over the welded edge inasmuch as there is no free edge which may separate as a result of the flexing.

The workpieces 14, 15 are jointly moved in the direction of the arrow C at a certain speed which is identical with the speed at which the wire electrodes 16, 22 advance in the direction of the arrows A, B, respectively. The rocking means 4, 5 presses the electrode 16 against the upper side of the workpiece 15 and thereby urges the workpiece 14 into contact with the electrode 22. The tensioning means 18, 24 subject the wire electrodes 16, 22 to sufficient tension so that these electrodes remain in continuous substantial surface-to-surface contact with the walls of grooves 19, 25, respectively. Such guidance and stretching insures a satisfactory flow of current between the rollers 10, 11 and the electrodes 22, 16, respectively so that a good welding seam is formed along the zones connecting the lines of contact between the electrodes and the exposed sides of the overlapping workpieces 14, 15. The lines of contact between the electrodes 16, 22 and the outer or exposed sides of workpieces 15, 14, respectively, in the welding gap G are indicated by the reference numerals 31 and 32. Thus, the welding current flows in a circuitous path from the secondary transformer winding 13, through the conductor 13a, through the roller 10, through the wire electrode 22, and the contact 32, through the workpieces 14, 15 through the contact 31, through the wire electrode 16, through the upper roller 11, through the conductor 13b and back to the secondary winding 13. During the welding operation, the tin, zinc, or other weldant material begins to flow along the zones connecting the lines of contact between the coated sheets 14, 15 and the wire electrodes 22, 16, respectively, and spots of molten material are entrained by the wire electrodes toward the respective advancing means 27, 26. The weldant material contaminates the surfaces of the wire electrodes, particularly such portions of their surfaces which were in contact with the two workpieces. However, such contaminants in no way affect the welding operation because the advancing means 26, 27 insure that new zones of wire electrodes are continuously moved into contact with the workpieces.

The once used contaminated wire electrodes 16, 22 may be melted or may be cleaned in a mechanical or chemical process. In the latter case, the cleaned wire electrodes may be utilized for a second time. When chemically treated, the contaminated wire electrodes are subjected to the action of diluted caustic soda solution. If the electrodes 16, 22 consist of copper wire, and if such copper wire electrodes are utilized for the seam welding of tinned sheet iron, the tin accumulating on the wires past the welding station in the gap G may be removed by melting. FIG. 1 shows cleaning means 40, 41 for the electrodes 16, 22, respectively. These cleaning means may be disposed between the supply spools and the respective supporting or pressing rollers so that the spools 17, 23 restore contaminated wire electrode material and that the electrodes are cleaned in a fully automatic way during their advance toward the welding gap. Alternatively, a single cleaning means may be provided for both wire electrodes.

I claim:

1. The method of seam welding overlapping workpieces by electric resistance welding comprising the steps of providing a pair of relatively adjustable electrode rollers each of which has a peripheral groove, providing a pair of elongated electrodes of indeterminate length having portions cooperatively engaged with the peripheral grooves of said rollers, each of said electrodes having a relatively narrow flat planar face spaced from and generally parallel with the flat planar face of the other electrode and defining a welding gap, placing said overlapping workpieces between and in engagement with said electrodes, one of said electrodes overlapping the edge of one of said workpieces and the other electrode being spaced from the edge of the other workpiece, advancing said workpieces and said electrodes through the welding gap at the same rate while maintaining said one electrode in overlapping relationship with the edge of said one workpiece, and supplying electrical energy to said electrodes so that a current will pass from one electrode through said workpieces to the other electrode to weld the workpieces together along a continuous seam and the edge of said one workpiece will be welded to the other workpiece.